July 18, 1967  E. R. SARRATT  3,332,079
LORAN-C CYCLE-MATCHING APPARATUS
Filed April 7, 1965  6 Sheets-Sheet 1

INVENTOR.
*Everett R. Sarratt,*
BY
*Paul & Paul*
ATTORNEYS.

FIG. 4

FIG_5

FIG_6.

United States Patent Office 3,332,079
Patented July 18, 1967

3,332,079
LORAN-C CYCLE-MATCHING APPARATUS
Everett R. Sarratt, Timonium, Md., assignor to
ENAC/Triton Corp., Cockeysville, Md., a corporation of Maryland
Filed Apr. 7, 1965, Ser. No. 446,229
18 Claims. (Cl. 343—103)

This invention relates to a form of hyperbolic radio navigation system known as Loran-C. The Loran-C system has been described in various publications, including, for example, a report entitled, "The Loran-C System of Navigation," prepared for the U.S. Coast Guard by Jansky and Bailey and published in February 1962.

*General description*

The Loran-C navigation system is employed by ships and also by aircraft. Operation of the Loran-C system is based on measuring the time difference between radio signals received from two transmitters whose locations are known.

Loran-C coverage is available throughout most of the ocean area of the Northern Hemisphere. Reliable position information can be obtained from shore stations at distances up to 700 nautical miles during the day and almost twice as far during the night. When tuned to the desired Loran-C transmitter, the receiving set on the ship or aircraft measures the period between the arrival time of a pair of Loran-C pulses. This provides a reading which corresponds to a line-of-position (LOP) on the Loran-C chart. Readings on other rates or other pairs of pulses provide additional lines-of-position which intercept on the chart or which can be plotted.

The Loran-C system operates on a center carrier frequency of 100 kilocycles per second (kc./s.) and within a spectrum between 90 and 110 kc./s.

The Loran-C system employs master stations and slave stations. The master station transmits a series of spaced pulses and at least several hundred miles away the slave station transmits a series of pulses which are accurately synchronized with those of the master station pulses. The time difference at the receiver on the ship or plane, between the reception of the master pulse and the corresponding slave pulse establishes the Loran-C line-of-position.

The master and slave pulses are not transmitted simultaneously. Each slave pulse is delayed by a carefully controlled delay so that the corresponding master pulse is always received first at the receiver. This eliminates any ambiguity in identifying the pulses.

Loran-C stations are so located that signals from two or more pairs of stations may be received within certain areas and thus a Loran-C fix may be obtained by crossing two or more lines of position. The signals transmitted from the different Loran-C stations are identified by two distinguishing characteristics, namely, radio-frequency channel and the pulse recurrence rate.

To reduce the number of frequency channels used, a number of pairs of Loran-C stations are operated on the same channel but each pair of stations transmits at a difference pulse recurrence rate. The receiver operator selects a pair of stations by making the sweep recurrence rate of the cathode ray indicator tube the same as the pulse recurrence rate of the desired Loran-C pair of stations. The signals from these stations will then be stationary on the screen, while signals of other pairs of stations (assuming the receiver is within the range of other stations) drift across the screen and are ignored.

In the Loran-C system, the master station transmits a group of nine pulses. The eighth and ninth pulses are closer spaced then the other pulses. The slave stations transmit groups of eight equally spaced pulses. When synchronization of the master and slave station transmitters is lost, the ninth pulse of the master station group shifts back and forth. This is known as blinking.

Each master station has at least two associated slave stations which are normally separated from the master by 500 to 700 nautical miles. The basic repetition rates for the Loran-C stations may be as low as ten cycles per second, or as high as 33⅓ cycles per second.

*The receiver*

Loran-C receiver or D–X Navigator comprises a superheterodyne receiver, a precision timer-indicator, and related power supply. The timer utilizes a crystal-controlled oscillator-driven glow-transfer-tube countdown divider chain to provide the necessary timing increments for convenient decade delay measurement. The receiver provides coverage of three Loran-A as well as the Loran-C channels with selectivity characteristics adequate for the pulse resolution compatible with high interference rejection.

Complete receiver equipments include facilities for: (a) Generating the required time basis for synchronization of the cathode-ray indicator tube sweep with the transmitted pulses from the shore-based Loran-C transmitting stations; (b) Generation of the necessary master and slave station reference signals; (c) Reception and display of the video pulses for time difference measurement; and (d) Interconnecting the various components by front panel controls to provide a completely integrated operational unit.

In simplest form, the Loran-C receiver must provide a facility for receiving the pulses and a mechanism for measuring the pulse time separation. Conventional pulse time separation measurement involves display of the pulses on a cathode ray tube having a dual horizontal sweep, controlled by a precise time base, and which can be synchronized with the received pulse train. The time base design includes a marker (pedestal) for each of the dual traces. The first marker is positioned on the upper trace a fixed time after the beginning of the sweep. The position of the second marker on the lower trace can be varied by the setting of the delay controls. Master and slave time difference measurement merely entails adjustment of the time base for upper marker coincidence with the master pulse and adjustment of lower marker for coincidence with the slave pulse. In operation, the time base is adjusted for master pulse coincidence with the master pedestal by the left-right switch while the lower pedestal is adjusted by the time base delay controls for coincidence with the slave pulse. In the final phase of measurement which involves actual pulse envelope comparison, the cathode-ray tube sweep is initiated by the leading edge of the marker and the sweep speed is increased for high resolution.

The time base design of a direct reading Loran–C receiver known as D–X Navigator includes a crystal-controlled timing generator and glow-transfer-tube decade counter chain with division factors appropriate for full coverage of all basic and specific pulse repetition rates. The master marker trigger signal is extracted from the counter chain a fixed time after the beginning of a counter cycle while the slave marker trigger signal can be switched to various points in the chain by the front panel operated delay controls.

The basic timing generator is a 100-kilocycle crystal-controlled oscillator which drives a division-by-five multivibrator. The multivibrator provides 10-microsecond output pulses at a 20-kilocycle rate. The 20-kilocycle multivibrator drives a bistable stage thereby dividing the 20-kilocycle rate by two and delivering 10-kilocycle pulses. The output from the binary stage is combined with the positive 20-kilocycle pulses from the multivibrator in a gate which feeds to the first glow-transfer-tube decade alternate pulses from the division-by-five multivibrator. By this means, the first decade is fed a 10-microsecond pulse every 100 microseconds, thereby providing fast and uniform switching of the first decade at 100-microsecond intervals.

Upon completion of each counting cycle of the first decade, the second decade is advanced one digit by the same pulse which advanced the first decade. Further, upon completion of each cycle of the second decade, the third decade is advanced one digit by the same pulse which advanced the first and second decades.

The present invention—objects and advantages

The object of the present invention is to provide cycle-matching means for improving the precision and accuracy of a Loran-C direct reading receiver, such as the D-X Navigator.

In its present form, the Loran-C cycle-matching equipment of the present invention is mounted on a sub-chassis adapted to be connected to, and to supplement, the D-X Navigator receiver.

The Loran-C cycle-matching equipment of the present invention is independent of the accuracy of the glow-transfer tube counter of the D-X Navigator receiving equipment. This is an important advantage.

A further advantage is that the Loran-C cycle-matching equipment of the present invention is polarity sensitive, making it possible for the operator to determine whether he should adjust in one direction or the other. This is in contrast to the prior art receiver system wherein, when the operator attempts to superimpose the slave pulse on the master pulse, if one of the pulses is moving back and forth relative to the other, it is almost impossible to determine which is the slave pulse and which is the master pulse. In contrast to this difficulty, adjustment of the phase-detector cycle-matching equipment of the present invention moves the trailing edge of the slave pulse up or down, the trailing edge of the master pulse remaining fixed. It is accordingly relatively easy for the operator to see and to decide whether it is necessary to move the trailing edge of the slave pulse up or down in order to match it with the trailing edge of the master pulse.

A further advantage of the Loran-C cycle-matching unit provided by the present invention is that it is a low-cost inexpensive piece of equipment.

General description

The relative phase of the master and slave radio frequency envelopes is determined by observing the wave forms from a phase detector which is common to both the master and slave pulses. This observation is made on the Loran-C indicator cathode-ray-tube. The reference voltage fed to the phase detector is derived from a crystal oscillator which is phase locked to the 1st, 5th and 7th pulses of the Loran-C master pulse group. These pulses are used for phase-locking because the radio-frequency energy in these pulses starts at the same phase (+) throughout the Loran-C system.

The same crystal oscillator reference voltage which is phase-locked to the master pulses, is fed through a phase shifter system which may be varied over a 360° range by the units delay measurement control and gated into the common phase detector for slave phase comparison. Adjustment of the units delay control, as required to superimpose, on the cathode-ray-tube, the master and slave traces from the phase detector, permits direct reading of the phase-matched time delay in microseconds.

Zero phase shift between the reference voltages fed to the phase-detector for the master and slave signals for similar phase-detector output waveform indicates a units delay control setting of zero. The phase shift required for maintenance of master and slave superposition is 360°, as the delay of master and slave pulses varies over a 10-microsecond range. Accordingly, a 0° to 360° linear phase lag of the phase-detector reference voltage is provided by the front-panel-operated units delay control, as this control is rotated from zero to 9.99. This phase-delay voltage is gated into the phase detector at the time the slave signal is displayed on the cathode-ray-tube.

Specific description

Referring now to FIGS. 1–6, a 625-kilocycle (kc.) signal from the converter oscillator V2 of the D-X Navigator Loran-C receiver (FIG. 2) applied to the amplifier V307 (FIGS. 3 and 4) and the output of amplifier V307 is applied to mixer V310 where it is mixed with a 525-kc. signal from the I-F output stage V4 of the D-X Navigator Loran-C receiver. The output of mixer V310 is a 100-kc. signal which has the same phase coherence as the original 100-kc. signal received by the Loran-C receiver. This 100-kc. signal is amplified in amplifier V311 and applied through transformer T302 (FIG. 5) to the phase detector (diodes CR320 and CR321) where it is compared with signals applied through the double-triode gate V312 and the transformer T301. The output of the phase detector CR320–CR321 is amplified in amplifier V308B and the output of amplifier V308B is applied to the vertical plates of the cathode ray tube V22.

The output of amplifier V308B is also applied to the multi-diode gate CR322-323-324-325. Pulses from the thousands glow-tube counter V25 of the D-X Navigator Loran-C receiver are applied through gate CR329-330-331 to multivibrator V309 (FIGS. 3 and 6) and the output of multivibrator V309 is applied to the diode gate CR322-3-4-5 (FIGS. 3 and 5) to gate through the first, fifth and seventh pulses of the master pulse group.

The output of gate CR322-3-4-5 is applied to the voltage variable capacitors CR301-CR302 (FIGS. 3 and 4) which function like a reactance tube and whose purpose is to phase lock the 100-kc. oscillator V305 with the phase of the first, fifth and seventh pulses of the master pulse group.

Oscillator V305 is a crystal controlled oscillator whose 100-kc. phase-locked output is applied to phase detector CR320–CR321 by way of two paths. One is a direct path 312M (FIG. 3) through gate V312. The other path is also through gate V312 but is by way of a phase shift system and lead 312S. Through gate V312 via direct path 312M travel the reference master pulses. Through gate V312 via the phase shift path 312S travel the reference slave pulses. Both types of reference pulses are applied through gate V312 to the phase detector CR320–CR321.

The phase shifter system, through which the reference slave pulses are passed, comprises the binary divider V304, the ramp generator V303, the adjustable clipper system V302A–V308A, the shaper V302B–V301A–V301B and the 100-kc. ringing circuit V306. The 100-kc. signal is then applied via lead 312S through gate V312 to the phase detector CR320–CR321.

Figure 3:
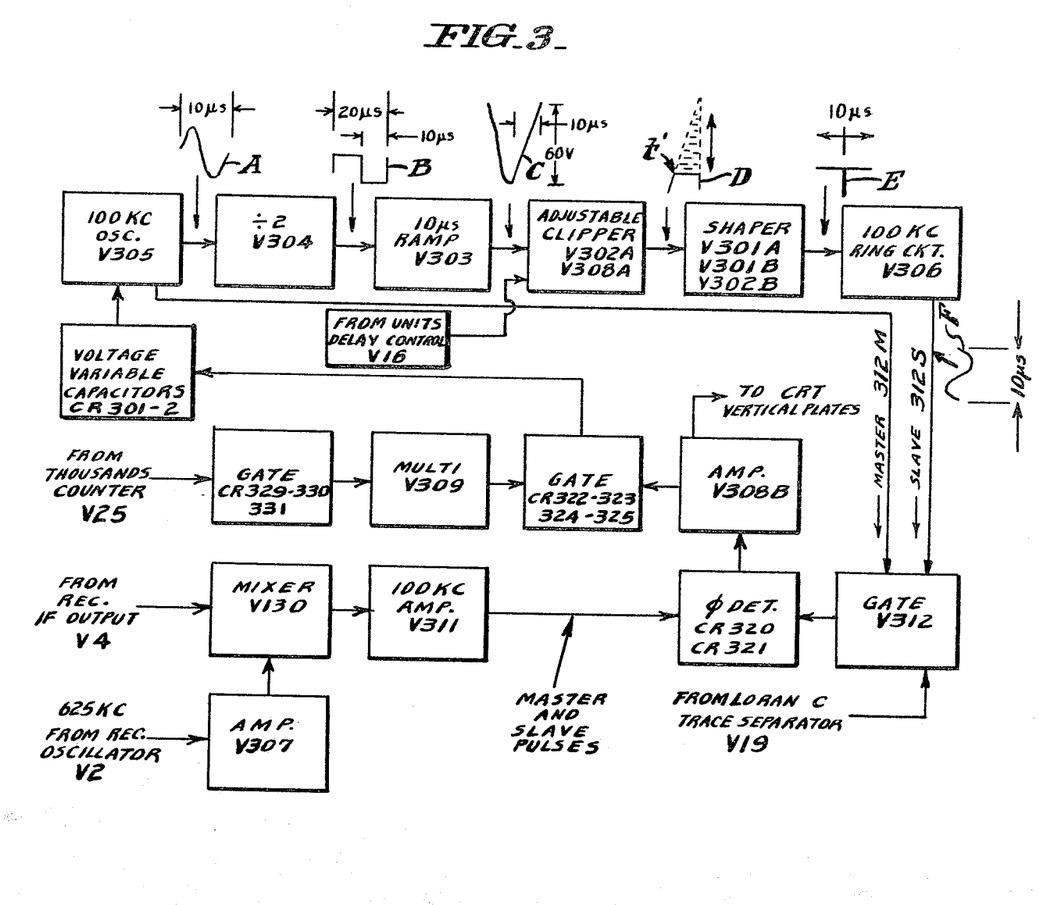
FIG. 3 is a function block diagram of the Loran-C cycle-matching equipment provided by the present invention.
Figure 4:
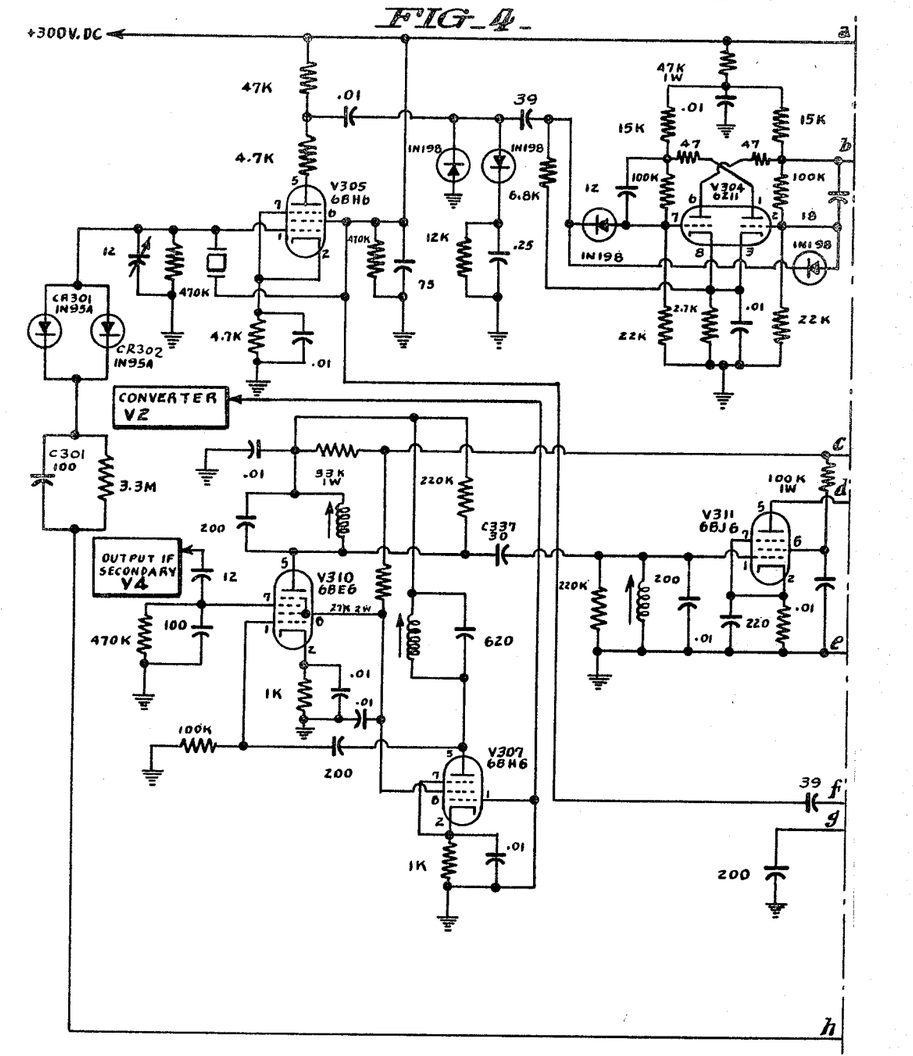
FIGS. 4, 5 and 6, when combined in side-by-side relation, represent a detailed schematic diagram of the Loran-C cycle-matching equipment provided by the present invention.
Figure 5:
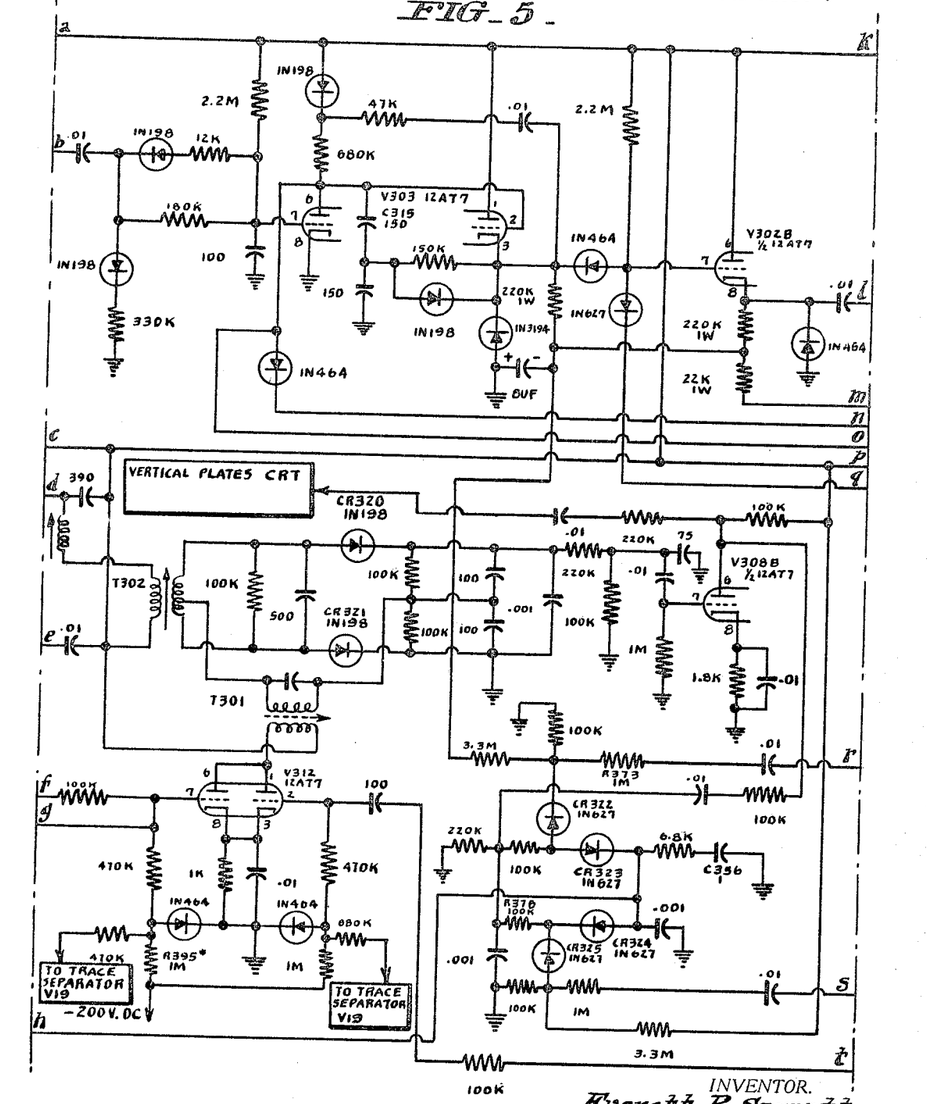
Figure 6:
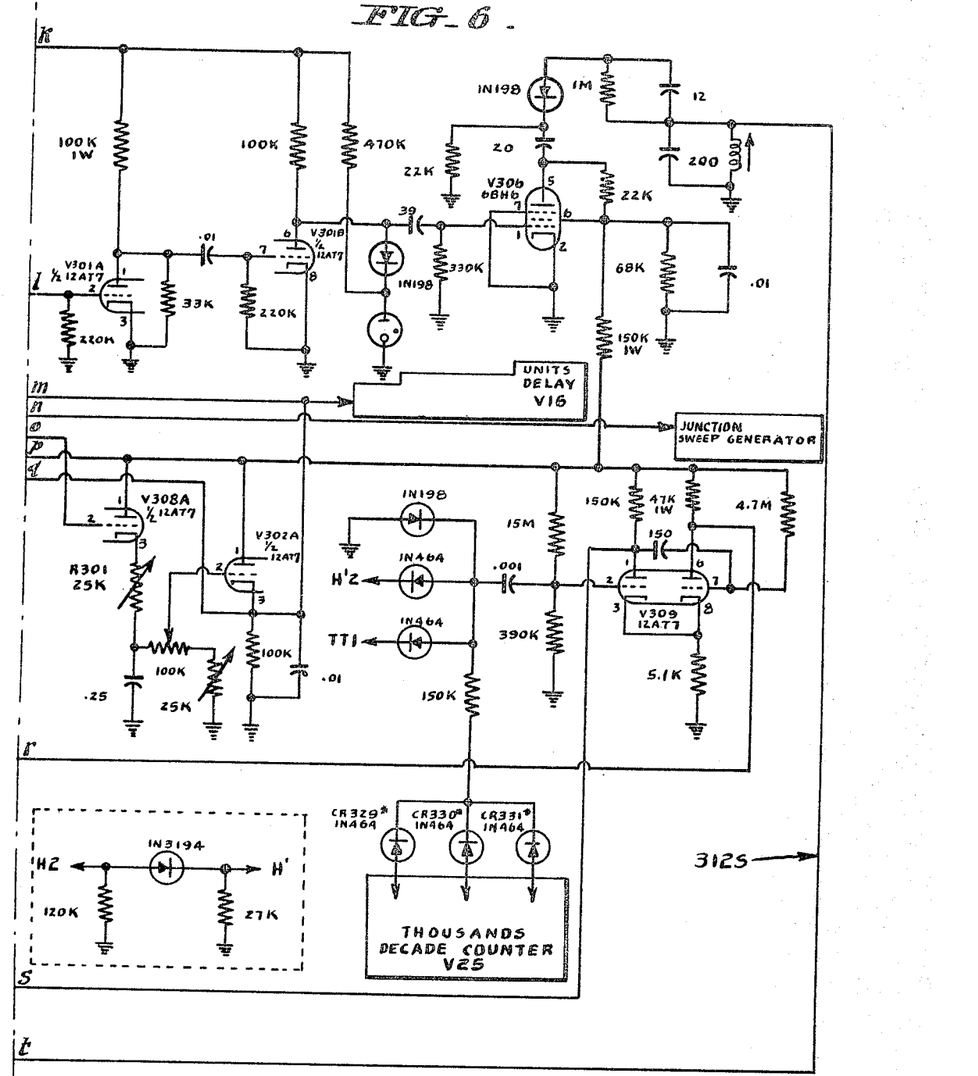

The phase shifter system will now be described in greater detail. As shown in FIG. 3, the output A of the 100-kc. crystal controlled phase-locked oscillator V305 is applied to a binary divider V304 whose output is a 20-microsecond square wave pulse B. This 20-microsecond square wave pulse B is applied to the 10-microsecond ramp generator V303 to produce a 10-microsecond ramp signal C having a waveform such as is depicted in FIG. 3. This ramp signal C may, in a typical case, have a magnitude of 60-volts. The ramp signal C from ramp generator V303 is applied to the adjustable clipper system V302A–V308A to produce a truncated signal represented by waveform D in FIG. 3. The amplitude of the signal D delivered by the clipper system is a function of the clipper-system adjustment. This is indicated by the dotted-line waveforms illustrated in FIG. 3.

The output of the adjustable clipper V302A–V308A is applied to a shaper system V302B–V301A–V301B. The output of the shaper is a negative-going spike pulse E whose time occurrence is variable over a 10-microsecond range, as indicated by the arrows in FIG. 3. The time at which the spike pulse E occurs is dependent upon the adjustment of the adjustable clipper system since the time of occurrence of the negative spike E is coincident with the time of clipping of the ramp voltage C in clipper system V302A–V308A. This instant is represented by the reference letter $t'$ at the truncated signal D illustrated in FIG. 3.

The negative spike E delivered by the shaper is applied to a 100-kc. ringing circuit V306 whose output is a 100-kc. sine wave signal F. The phase of the sine wave signal F may be varied over a 360° angle according to the time of occurrence of the spike pulse E as controlled by the adjustment of the clipper V302A–V308A. This is equivalent to a continuously variable time delay range of from 0 to 10 microseconds. The sine wave signal F delivered by the ringing circuit V306 is applied to the gate V312 by way of the lead 312S, and is gated through to the phase detector during the slave-pulse period. Gate V312 is controlled by signals from the trace separator V19 of the D–X Navigator Loran-C receiver.

Figure 1:
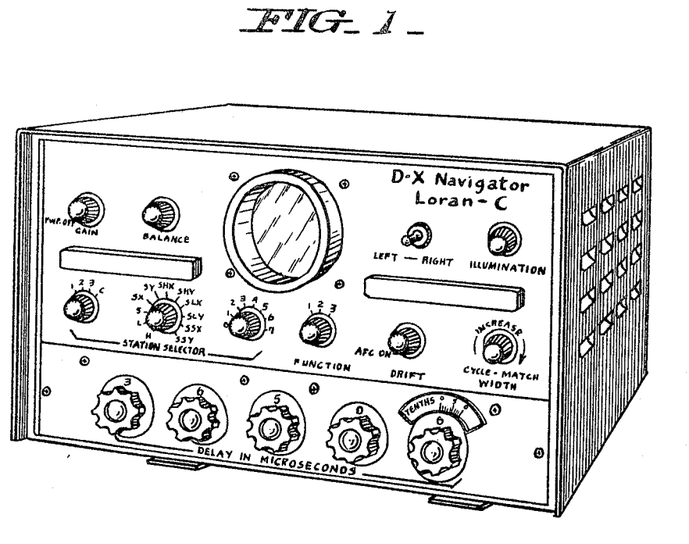
FIG. 1 is a view of the front panel controls of the D-X Navigator Receiver.
Figure 2:
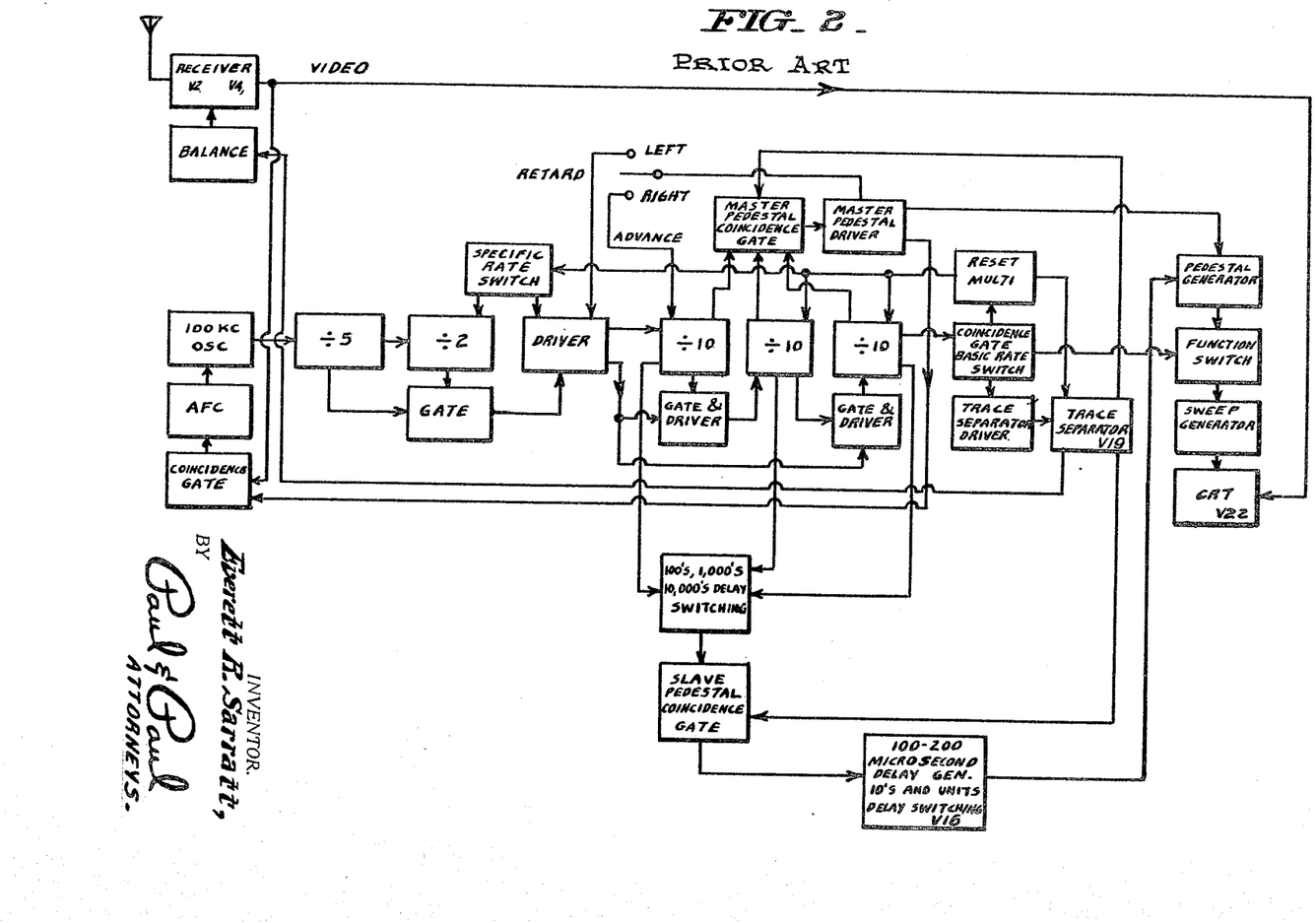
FIG. 2 is a block diagram of the D-X Navigator Receiver.

The relative phases of the master and slave radio-frequency envelopes are determined by visually observing the waveforms from phase detector CR320–CR321 on the cathode ray tube, and by adjusting the adjustable clipper V302A–V308A to superpose the master and slave pulses. This is done by adjusting the units "Delay-in-Microseconds" control on the front panel of the D–X Navigator Loran-C receiver (FIG. 1).

The "Delay-in-Microseconds" control comprises five decade dials for adjusting the delay chain of the receiver. These dials are shown in FIG. 1. Included among the dials shown in FIG. 1 are the following:

The "Gain" control serves the dual function of primary power switch and of gain control to adjust sensitivity.

The "Station Selector" comprises three switches as follows: (1) channel 1, 2, 3 or C; (2) basic rate H, L, S, SX, SY, etc.; (3) specific rate 0 through 7. For example, CS5 specifies channel C (100 kc.), S basic rate (20 c.p.s.) and specific rate 5.

The "function" switch selects three sweep speeds for the cathode ray indicator tube as follows:

Function 1 displays the complete loran cycle divided into two horizontal indicator tube traces with vertical displacement to permit identification of master and slave pulses. Marker pedestals appear on both upper and lower traces as a guide in positioning master and slave pulses and to permit coarse delay control measurement. The upper pedestal is fixed near the beginning of the sweep, while the lower pedestal can be positioned on the sweep line by the delay controls.

Function 2 effects magnification of the pedestal portion of the Function 1 sweep to occupy full indicator tube sweep. Initiation of upper and lower sweeps correspond to the respective upper and lower pedestals.

Function 3 effects further magnification of the left portion of both pedestals. Trace separation is removed so that the lower and upper traces may be superimposed. Extent of magnification is such that the master and slave pulses occupy more than half the sweep width.

The "Balance" control adjusts the ratio of receiver gain to master and slave signals as required for equal heights on the indicator tube.

The "Left-Right" control positions the master pulse on the master pedestal.

The "Drift" control provides fine left-right adjustment of pulse positions. Full counterclockwise rotation switches in the automatic frequency control which locks the timing generator frequency to the received pulse.

The "Width" control provides adjustment of Function 1 trace width on the indicator tube as required for different station rates.

The "Delay-in-Microseconds" adjusts the delay chain for measurement as follows:

Function 1: Positions the slave pedestal beneath the slave pulse with the pulse located to the left of the pedestal.

Function 2: Alignment of master and slave pulses.

Function 3: Superposition of master and slave pulses for final adjustment.

For Loran-C stations, the "delay in microseconds" control is initially set to approximate the minimum delay range of the slave to be measured.

*Operation*

To take a Loran-C reading the operator would, in a typical case, proceed as follows: He would turn the set on by rotating the Gain control clockwise and he would set the Stations Selector controls by turning the left control to position C, the center control to the basic rate, and the right control to the specific rate, to receive a desired pair as indicated on the applicable Loran chart. The Balance control would be adjusted so that the control index mark is vertical, and the Function control would be set to Function 1. The Drift control would be turned fully counter clockwise to the AFC ON position and the Width control would be set as required for full indicated sweep width on Function 1. The illumination control would be set as required to provide the desired intensity of panel and delay indication illumination. The operator would then make an initial setting of the delay dials to the approximate minimum delay range of the slave to be measured. For example, SX delay range would have a minimum value of 10,000 microseconds, while the SY range minimum would be 25,000 microseconds.

The operator would select a set of pulse groups on the indicator tube and adjust the Gain control for good definition, disregarding other pulses which drift across the screen. The Balance control would be adjusted as required for good definition of pulses on the upper trace of the indicator tube. The Left-Right control would be adjusted as required to position the left-hand pulse of the master group of pulses on the upper or master pedestal. After lefting the signals to the approximate desired position, the Drift control would be turned to the AFC ON position so that the signals may be locked by the AFC system. The master group would then be readily identifiable since the master group comprises nine pulses with the right-hand pair more closely spaced than the other pulses of the group, while the slave group consists of eight equally spaced pulses. After the master group of pulses is positioned on the master pedestal, the Balance and Gain controls are readjusted as required to make the master and slave groups of equal height.

The Delay in Microsecond switches would then be turned as required to position the slave pedestal beneath the slave pulse. The Function switch would then be switched to Function 2 and the position of the master pulse noted on the indicator tube. At this stage, the upper pulse should be to the left of the sweep near the beginning, and the AFC should be locked. In Loran-C measurement, only the left hand pulse of each group is involved in the measurement. The Gain and Balance controls are readjusted for equal size of master and slave pulses, and further Delay controls adjustments are made as required to place the slave pulse directly under the master pulse.

The Function switch is then switched to Function 3, and the Delay controls are adjusted for best match of the leading edge of the pulses. During the final Delay adjustment, the Gain and Balance controls are again adjusted as required for exact pulse superposition. Upon completing this step, the time difference may be read directly from the Delay in Microseconds control setting. The reading thus obtained specifies a line of position as indicated on the Loran chart for the particular station pair involved.

Figure 7:
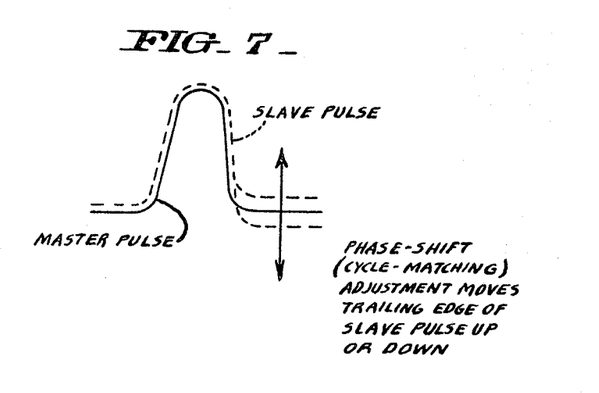
FIG. 7 is a graphical representation of the superposed master and slave pulses as controlled by the cycle-matching adjustment.

In the absence of the cycle-matching equipment of the present invention, when the operator tries to superimpose the slave pulse on the master pulse he may have difficulty in determining which is the master pulse and which is the slave pulse, since they may move back and forth relative to each other. This difficulty is obviated when the cycle-matching equipment of the present invention is employed.

Where the cycle matching equipment of the present invention is employed, when, on Function 3, the operator adjusts the Units control of the Delay in Microsecond control to superimpose the slave pulse on the master, he obtains a result such as is depicted in FIG. 7 of the drawing of the present application. In FIG. 7, the master pulse is represented in solid line and the slave pulse is represented in dotted line. In the drawing, in order to illustrate the two pulses, the dotted-line slave pulse has been drawn slightly above the solid-line master pulse, but this would not be the situation in actual practice. In actual practice the controls would be adjusted until one pulse was superimposed on the other.

Using the cycle-matching equipment of the present invention, when the Units control of the five-dial Delay in Microsecond control system is adjusted, the master pulse remains fixed but the trailing edge of the slave pulse is moved vertically up or down, as is indicated in FIG. 7 by the arrows. The phase adjustment achieved by adjusting the Units Delay control affects primarily the trailing edge of the slave pulse. This is because of the delay of approximately 100-microseconds which is introduced by the narrow-band 100-kc. amplifier V311. Because of this delay, the effect of the phase detector output on the cathode ray tube trace is at the trailing edge of the slave pulse envelope.

As the Units Delay in Microseconds control is varied to adjust the clipper V302A–V308A, the trailing edge of the slave pulse observed on the indicator tube moves either upward or downward relative to the trailing edge of the master pulse. The adjustment is polarity sensitive; the operator can readily see whether by adjusting the Units Delay dial in one direction he moves the trailing edge up or down. Thus, he can readily determine whether to adjust the Units Delay dial in one direction or the other to superpose the trailing edge of the slave pulse on the trailing edge of the master pulse. This is an important advantage over the prior art cycle-matching technique.

A further advantage of the cycle-matching system of the present invention is that it is independent of the accuracy of the glow tube decade counter. Furthermore, the cycle-matching equipment is of relatively low cost.

Summary

The action of the cycle-matching equipment of the present invention may be summarized as follows:

Reference voltages are fed to phase detector CR320–CR321 derived from a 100-kc. crystal oscillator V305 which is phase locked to the first, fifth and seventh pulses of the Loran-C master pulse group. The first, fifth and seventh pulses are used for locking purposes because the radio-frequency energy in these pulses starts at the same phase (positive). The reference voltage from the 100-kc. crystal oscillator V305 is applied to phase detector CR320–CR321 directly by way of lead 312M through gate V312, and is also applied through gate V312 to the phase detector by way of a phase-shifting circuit and lead 312S. The direct lead 312M carries the master reference pulses. The phase-shifter path via lead 312S carries the slave reference pulses. Gate V312 functions to feed the reference voltage directly to the phase detector CR320–321 during the period the master pulses are being received, and to feed the reference voltage to the phase detector via the phase shift system during the period the slave pulses are being received.

The phase shift path via 312A provides for variation of the phase over a 360° range. The phase of the reference signal delivered from the 100-kc. ringing circuit V306 is controlled by the Units Delay in Micro-seconds control on the front panel of the D-X Navigator. This Units Delay control adjusts clipper V–302A, V–308A and hence adjusts the time of occurrence of the negative spike E which controls the phase of the 100-kc. signal produced by the ringing circuit V306. This signal is gated through gate V312 into the common phase detector CR320, CR321 during the slave pulse period and is used for phase comparison of the slave pulses.

As previously explained, adjustment of the adjustable clipper V302A–V308A by the Units Delay control is capable of adjusting the time of occurrence of the spike pulse output E of shaper V302A–V301 over a 10-microsecond range. Thus, the application of the spike pulse E to ringing circuit V306 controls the time of occurrence of the 100-kc. ringing signal within a 10-microsecond range.

In the Loran-C system, the delay between the master and slave pulses may vary over a 10-microsecond range. Thus, a 360° phase shift is required to maintain master and slave in superposed position since at 100 kc., a single cycle of 360° requires 10-microseconds. Accordingly, a zero° to 360° linear phase lag of the reference voltage of phase detector CR320–321 is provided by the front-panel operated Units Delay control as this control is rotated from zero to 9.99. This phase-delayed voltage is gated through gate V312 into the phase detector at the time the slave signal is displayed on the cathode ray tube.

Because of the time delay inherent in passing pulses from the mixer V310 through the 100 kc. amplifier V311, the major effect of adjusting the output of phase detector CR320–CR321 as observed on the cathode ray indicator tube occurs at the trailing edge of the pulse. This is illustrated in FIG. 7 of the drawings.

When the Units Delay control has been adjusted as required to superpose the slave and master traces on the cathode ray indicator tube, the time delay in microseconds is read directly from the Units Delay control. A Units Delay control setting of zero for superposition indicates zero phase shift between the reference voltages fed to the phase detector CR320–321 for master and slave signals. A Units Delay control setting of 9.99 for superposition indicates a phase delay of 360°.

Having described my invention, I claim:

1. In a Loran-C receiver system having means for receiving groups of master and slave pulse signals transmitted during alternate time periods, an indicator tube, and means, including adjustable delay means for visually superimposing on said indicator tube at least the first of the pulses of said master and slave groups thereby to provide coarse matching, the improvement which comprises provision of fine-adjustment cycle-matching means for measuring accurately the time difference between said received master and slave pulses, said cycle-matching means comprising: a reference oscillator adapted to operate at a frequency equal to the carrier frequency of said received master and slave pulse signals; first gate means; means coupling said first gate means to said reference oscillator; means for applying selected of said received master pulses to said first gate means to pass energy to said reference oscillator for locking the phase of said reference oscillator to said received master pulses; a phase detector; means for applying received master and slave pulses to said phase detector; an adjustable phase-shift system; means, including second gate means, for applying the output of said reference oscillator directly to said phase detector during the master pulse periods and by way of said phase shift system during the slave pulse periods for phase comparison with the received master and slave pulses; means for applying the output of said phase detector to said indicator tube; and means for coupling the adjustable delay means of said receiver to said adjustable phase-shift system for adjusting the phase delay provided by said phase-shift system to said reference oscillator output as required for fine matching of said master and slave pulses on said indicator tube, said adjustable delay means of said receiver being calibrated to provide a direct time reading in microseconds of the delay between said slave and master pulses.

2. Apparatus as claimed in claim 1 characterized in that means are provided for coupling the output of said phase detector to said first gate means, whereby the energy passed to said reference oscillator for locking the phase thereof to said master pulses is derived from said phase detector.

3. Apparatus as claimed in claim 2 further characterized in that means coupling said first gate means to said reference oscillator includes a voltage variable capacitor.

4. Apparatus as claimed in claim 3 further characterized in that said reference oscillator is a crystal-controlled oscillator.

5. Apparatus as claimed in claim 1 further characterized in that said means for applying received master and slave pulses to said phase detector includes amplifier means introducing a phase delay, whereby the major effect of the phase detector output on the indicator-tube trace occurs at the trailing edge of the pulse envelope.

6. Apparatus as claimed in claim 5 further characterized in that said phase-shift system includes, in series, a ramp generator, an adjustable clipper, a pulse shaper, and a ringing circuit.

7. Apparatus as claimed in claim 6 further characterized in that said means for coupling the adjustable delay means of said receiver to said phase-shift system comprise means coupled to said adjustable clipper for adjusting the time of occurrence of the pulse output of said shaper, thereby to adjust the phase of the output of said ringing circuit.

8. Apparatus as claimed in claim 7 further characterized in that said clipper is adapted to be adjusted over such range as to vary the phase of the ringing circuit output over a 360° range.

9. Apparatus as claimed in claim 8 further characterized in that said means for applying the received master and slave pulses to said phase detector include mixer means for preserving the phase coherence of said master and slave pulses.

10. In a Loran-C receiver system for receiving master and slave pulses and for presenting said received master and slave pulses in superimposed position on the screen of a cathode ray tube; means for locally generating reference signals phase-locked to received master pulses; phase-comparison means; means for applying received master and slave pulses to said phase-comparison means first and second coupling means for coupling reference signals to said phase-comparison means for comparison with the received master and slave pulses, respectively; delay means for adjusting the phase of reference signals presented via said second coupling means to effect matching of master and slave pulses; and means for presenting the output of said phase-comparison means on the screen of said cathode ray tube in side by side relation to said superimposed master and slave pulses and at the trailing edge thereof.

11. Apparatus as claimed in claim 10 characterized in that said delay means for adjusting the phase of reference signals coupled to said phase-comparison means via said second coupling means includes means providing a direct reading of the time difference in microseconds between slave and master pulses.

12. In a Loranc-C receiver for receiving pulse signals from master and slave stations and having adjustable pulse-counter delay means and a cathode ray indicator tube; generator means coupled to the counter means of said receiver for locally generating reference signals phase-locked to received master pulses; phase-detector means coupled to said generating means and also coupled to received pulse signals for comparing the phase of said locally generated reference signals with the phase of received pulses, the coupling means between said generating means and said phase-detector means comprising first and second paths; adjustable phase-shift means in said second path for adjusting the phase of locally-generated reference signals applied to said phase-detector means; means for coupling the output of said phase-detector means to said indicator tube; and means for coupling said pulse-counter delay means to said adjustable phase-shift means to adjust the time-delay of said phase-shift means to effect superposition of slave and master pulses on said indicator tube.

13. Apparatus as claimed in claim 12 characterized in that said adjustable pulse-counter delay means is calibrated to read the time delay required to effect said superposition.

14. Apparatus as claimed in claim 13 further characterized in that said adjustable phase-shift means includes, in series, a clipper, a pulse shaper and a ringing circuit, and in that said means for coupling said pulse-counter delay means to said phase-shift means comprises a coupling from said counter delay means to said clipper for adjusting the time of occurrence of the pulse output of said shaper, thereby to adjust the phase of the output of said ringing circuit.

15. Apparatus as claimed in claim 14 further characterized in that the first path of said coupling means between said generating means and said phase-detector means is a direct path.

16. Apparatus as claimed in claim 15 further characterized in that common gate means are provided in said first and second paths adapted to pass signals to said phase-detector means from said first path during master pulse periods and to pass signals to said phase-detector means from said second path during slave pulse periods.

17. Apparatus as claimed in claim 16 further characterized in that said generator means is a crystal-controlled oscillator coupled to the counter means of said receiver through a voltage variable capacitor and through gate means controlled by master pulses from said counter.

18. Apparatus as claimed in claim 17 further characterized in that said phase-detector means supplies energy to said voltage variable capacitor through said gate means controlled by master pulses from said counter, thereby to phase-lock said crystal-controlled oscillator to said master pulses.

References Cited

UNITED STATES PATENTS

| | | | |
|---|---|---|---|
| 2,515,464 | 7/1950 | Minneman | 343—103 |
| 2,523,244 | 9/1950 | Woodward | 343—103 |
| 2,651,033 | 9/1953 | Frantz | 343—103 |
| 2,697,219 | 12/1954 | Williams | 343—103 |
| 2,819,462 | 1/1958 | Frank | 343—103 |
| 2,824,303 | 2/1958 | Williams | 343—103 |

RODNEY D. BENNETT, *Primary Examiner.*

CHESTER L. JUSTUS, *Examiner.*

H. C. WAMSLEY, *Assistant Examiner.*